(12) United States Patent
Whitmore et al.

(10) Patent No.: US 6,892,989 B1
(45) Date of Patent: May 17, 2005

(54) METHOD FOR REDUCING THE DRAG OF BLUNT-BASED VEHICLES BY ADAPTIVELY INCREASING FOREBODY ROUGHNESS

(75) Inventors: Stephen A. Whitmore, Lake Hughes, CA (US); Edwin J. Saltzman, North Edwards, CA (US); Timothy R. Moes, Lancaster, CA (US); Kenneth W. Iliff, Lancaster, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 57 days.

(21) Appl. No.: 10/449,906

(22) Filed: May 29, 2003

(51) Int. Cl.$^7$ ................................................. B64C 9/00
(52) U.S. Cl. ...................... 244/200; 244/201; 244/203; 244/130
(58) Field of Search .............................. 244/199, 200, 244/130, 198, 201, 203

(56) References Cited

U.S. PATENT DOCUMENTS

| | | | |
|---|---|---|---|
| 2,261,558 A | 11/1941 | Orloff | 244/130 |
| 2,800,291 A * | 7/1957 | Stephens | 244/200 |
| 3,319,593 A | 5/1967 | Papst | 114/67 |
| 4,750,693 A | 6/1988 | Löbert et al. | 244/200 |
| 4,907,765 A | 3/1990 | Hirschel et al. | 244/200 |
| 5,114,099 A | 5/1992 | Gao | 244/130 |
| 5,133,516 A * | 7/1992 | Marentic et al. | 244/130 |
| 5,133,519 A | 7/1992 | Falco | 244/200 |
| 5,171,623 A | 12/1992 | Yee | 428/156 |
| 5,263,667 A | 11/1993 | Horstman | 244/209 |
| 5,346,745 A | 9/1994 | Banyopadhyay | 428/156 |
| 5,378,524 A | 1/1995 | Blood | 428/141 |
| 5,386,955 A * | 2/1995 | Savill | 244/200 |
| 5,505,409 A | 4/1996 | Wells et al. | 244/130 |
| 5,598,990 A * | 2/1997 | Farokhi et al. | 244/199 |
| 5,618,215 A | 4/1997 | Glydon | 441/65 |
| 5,803,410 A | 9/1998 | Hwang | 244/208 |
| 5,836,016 A | 11/1998 | Jacobs et al. | 2/69 |
| 5,848,769 A * | 12/1998 | Fronek et al. | 244/200 |
| 6,612,524 B2 * | 9/2003 | Billman et al. | 244/199 |

OTHER PUBLICATIONS

NASA Article "A Base Drag Reduction Experiment on the X-33 Linear Aerospike SR-71 Experiment (LASRE) Flight Program" dated Mar. 1999.

* cited by examiner

*Primary Examiner*—J. Woodrow Eldred
(74) *Attorney, Agent, or Firm*—John H. Kusmiss

(57) ABSTRACT

A method for reducing drag upon a blunt-based vehicle by adaptively increasing forebody roughness to increase drag at the roughened area of the forebody, which results in a decrease in drag at the base of this vehicle, and in total vehicle drag.

2 Claims, 3 Drawing Sheets

METHOD FOR REDUCING THE DRAG OF BLUNT-BASED VEHICLES BY ADAPTIVELY INCREASING FOREBODY ROUGHNESS

BACKGROUND OF THE INVENTION

1. Field of the Invention

This invention relates to methods and devices for reducing drag on blunt-body vehicles.

2. Description of the Related Art

Current proposed shapes for single-stage-to-orbit vehicles like the Lockheed-Martin X-33 and "Venture-Star" reusable launch vehicle (RLV) have extremely large base areas when compared to previous hypersonic vehicle designs. As a result, base drag, especially in the transonic flight regime, is expected to be very large, and will likely dominate or overwhelm all other factors relevant to the vehicle performance. Excessive base drag could seriously limit the range of available landing sites for the "Venture Star" and will reduce payload capability. The unique configuration of Lockheed-Martin RLV with its very large base are and relatively low forebody drag, offers the potential for a large increase in overall vehicle performance, if the base drag can be reduced significantly.

There have been previous attempts to generally address the issue of drag reduction by altering the surface of a vehicle.

U.S. Pat. No. 4,907,765 discloses a wall having a drag-reducing configuration comprising a wall structure with sharp edged ridges separated by valleys that have drag reducing characteristics.

U.S. Pat. No. 5,378,524 discloses a vehicle with an outer surface that includes a matrix of cavities. The vehicle is selected from the group consisting of automobile, airplane and boat.

U.S. Pat. No. 5,346,745 discloses a plurality of surface elements arranged in rows on the surface of an object, with the surface elements of each row being arranged generally orthogonal to the direction of relative motion of the object. Each surface element includes means defining a cavity, and the cavities are interconnected by means of passageways to facilitate fluid communication therebetween. The passageways facilitate equalization of pressure between the cavities of the surface elements in each row, which ultimately results in reducing turbulence around the object.

U.S. Pat. No. 2,261,558 discloses providing recesses of various sorts and shapes on the surface of a vehicle, such as will minimize the air and water resistance offered by the vehicle, especially when proceeding at relatively high speeds.

U.S. Pat. No. 5,171,623 discloses drag-reducing surface depressions that are shaped like sections of truncated cones, or hexagonal prisms, geodesic domes, and that cover the entire surface of the body of the vehicle.

What each of these prior art approaches has in common is that they use depressions in the vehicle surface to reduce drag at the locations of the depressions. However, none of these approaches address the issues peculiar to blunt-based vehicles with extremely large base areas, and none disclose reducing overall vehicle drag by increasing drag at particular areas of a vehicle. Therefore, a need exists for a method of reducing drag in a blunt-based vehicle with an extremely large base area that is effective, easy to implement, applicable to all types of blunt-based vehicles at all speeds, and does not decrease the inherent structural integrity of the vehicle

SUMMARY OF THE INVENTION

In view of the foregoing disadvantages inherent in the known types of drag reduction methods now present in the prior art, the present invention provides a new method of drag reduction wherein the same can be utilized for blunt-body vehicles with large base areas.

The general purpose of the present invention, which will be described subsequently in greater detail, is to provide a new drag reduction method which has many novel features that result in a method of reducing drag which is not anticipated, rendered obvious, suggested, or even implied by any of the prior art methods, either alone or in any combination thereof.

The methods discussed in this document offer a means to achieve such reductions. The method includes reducing the drag of a vehicle having a forebody and a base by coarsening the surface of the vehicle in order to increase drag along the coarsened surface, thereby reducing drag aft of the coarsened surface.

DESCRIPTION OF THE PREFERRED EMBODIMENT(S)

The detailed description set forth below in connection with the appended drawings is intended as a description of presently preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Drag reduction tests were conducted on the LASRE/X-33 flight experiment, a roughly 20% scale model of an X-33 forebody with a single aerospike engine at the rear. The experiment apparatus was mounted on top of an SR-71 aircraft. The tests investigated a novel method for reducing base drag by adding surface roughness along the LASRE forebody. Calculations showed a potential for base drag reductions of 8–14%. Flight results corroborate the base drag reduction, with actual reductions of 15% in the high-subsonic flight regime. An unexpected positive result of the test was that drag reductions persist well into the supersonic flight regime. This result is extremely important because it demonstrates that the boundary layer still has a significant influence on the base separation, even in the presence of oblique shock waves and supersonic expansion waves, i.e. the base area does not "shock-off" from the rest of the external flow field.

Figure 1:
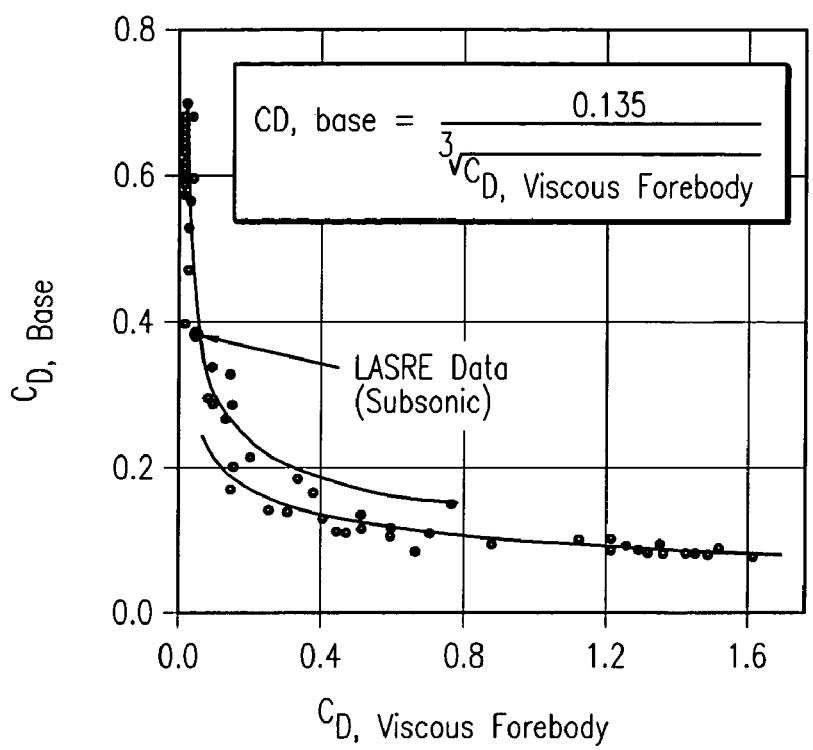
FIG. 1 is a graph of the subsonic correlation of base and viscous forebody drag coefficients.

For blunt-based objects whose base areas are heavily separated, i.e. experience detached flow conditions, a clear relationship between the base drag and the "viscous" forebody drag has been demonstrated. This trend is presented in FIG. 1 along with subsonic LASRE drag data. The trend presented in FIG. 1 shows that as the forebody drag is increased; generally the base drag of the projectile tends to decrease.

Figure 2:
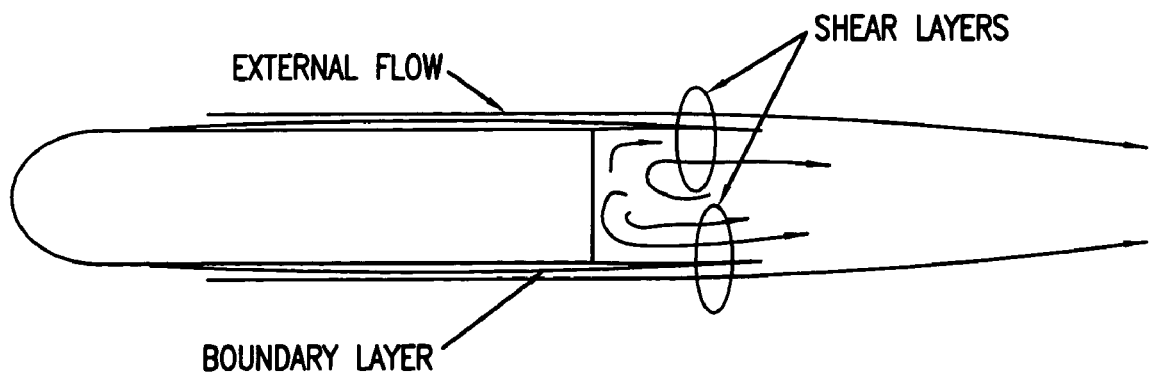
FIG. 2 is a visualization of a base pumping mechanism.

This base-drag reduction is a result of boundary layer effects at the base of the vehicle. The shear layer caused by the external flow rubbing against the separated air in the base region act as a jet pump and serves to reduce the pressure in the base area. This pumping effect is graphically illustrated in FIG. 2. The viscous high-speed external flow "pulls" air out of the base region because of 1) viscous shear forces in the shear layer and 2) the low static pressure in the external flow according to Bernoulli principles. These two effects cause the air to be "pumped" away from the base and the pressure to be reduced in the base region. Reduced pressure results in increased base drag.

The surface boundary layer acts as an "insulator" between the external flow and the air at the base. Consequently, a thicker boundary layer reduces the two base-drag causing effects. As the forebody drag is increased, the boundary layer thickens at the aft end of the forebody thereby reducing the effectiveness of the pumping mechanism and resulting in reduced base drag.

Because the LASRE drag data lie on the steep, nearly vertical, portion of the curve, a result of the large base drag, a small increment in the forebody friction drag should result in a relatively large decrease in the base drag. Conceptually, if the added increment in forebody skin drag is optimized with respect to the base drag reduction, then it is possible to reduce the overall drag of the configuration.

Figure 3:
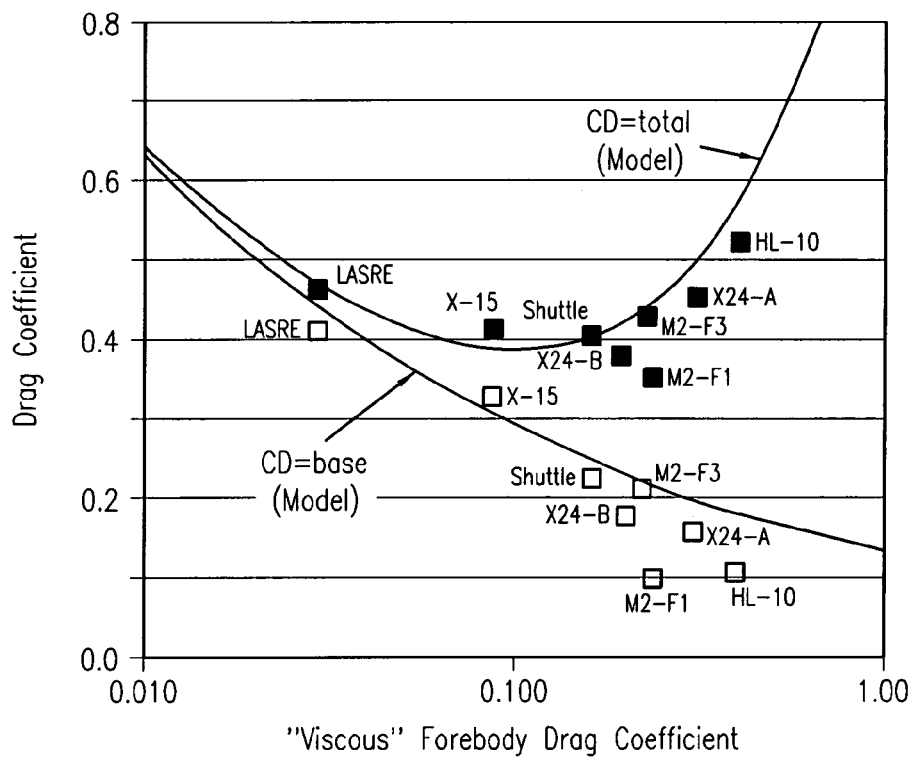
FIG. 3 is a graph depicting the visualization of the "drag bucket."

In order to predict the expected magnitudes of these drag reductions, a mathematical model of the LASRE base drag coefficient, which has the viscous forebody drag coefficient as a parameter was developed. The model accounts for flow compressibility using relationships defined by the Karman-Tsien correction and rules of similarity for transonic flow. If one plots the total drag of the vehicle as a function of the forebody drag, then a minimum value or "drag bucket" will occur at some value for the forebody drag coefficient. The model predictions are plotted in FIG. 3 along with measured data for several hypersonic lifting-body and wing-body configurations: X-15, M2-F1, M2-F2, Shuttle, HL-10, X-24A, X24-B and the LASRE (taken to represent the characteristics of the X-33/Venture-Star). Whereas most of the previously flown hypersonic shapes lie near or slightly to the right of the drag minimum, the X-33 lies far to the left of the drag minimum, as shown in FIG. 3. This behavior is a result of the previously discussed large "base-to-wetted-area" ratio. Thus the X-33 RLV shape offers a potentially high pay-off for overall vehicle drag reduction by simply increasing the vehicle forebody drag. The desired increase in forebody drag may be afforded by incorporating the roughness design into the surface thermal protection system (TPS).

Figure 4:
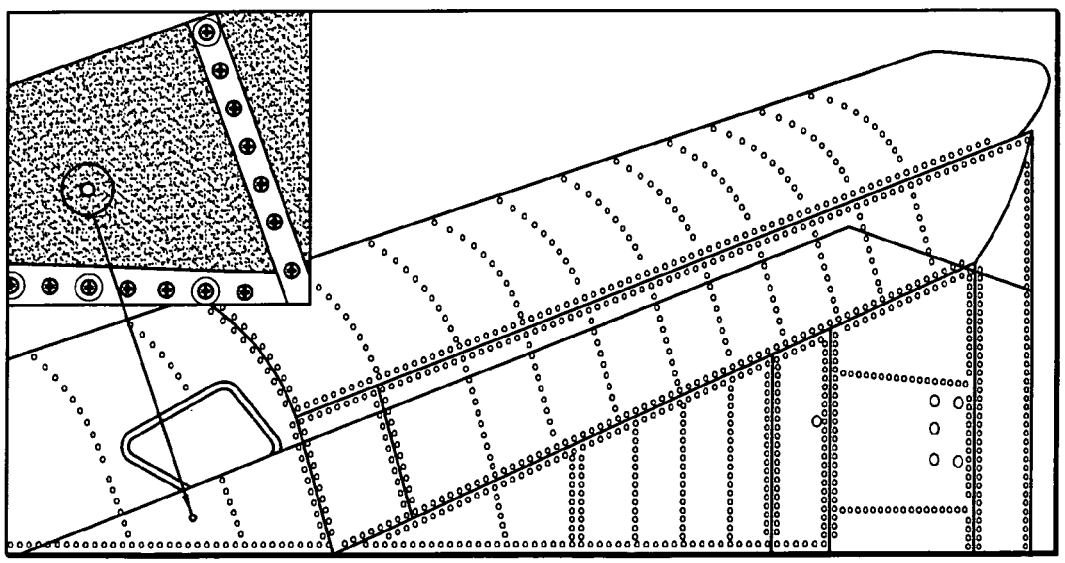
FIG. 4 depicts the layout of the LASRE forebody grit.

The LASRE drag reduction experiment sought to verify the above hypothesis. In this experiment the boundary layer at the back end of the LASRE model was modified by increasing the forebody skin friction. Clearly, one of the most convenient methods of increasing the forebody skin drag is to add roughness to the surface. Other methods such as using vortex generators to energize the boundary layer would probably work more effectively, however they must be used with care because their intrusiveness into the flow reduces their effectiveness with respect to the hypersonic re-entry vehicle problem. Benefits of using surface roughness are non-intrusiveness (minimal heating), small weight penalty, mechanical simplicity, and low cost. The resulting grit layout for the LASRE flight tests is depicted in FIG. 4. The resulting base drag reduction is compared against the predicted drag savings in FIG. 5.

Figure 5:
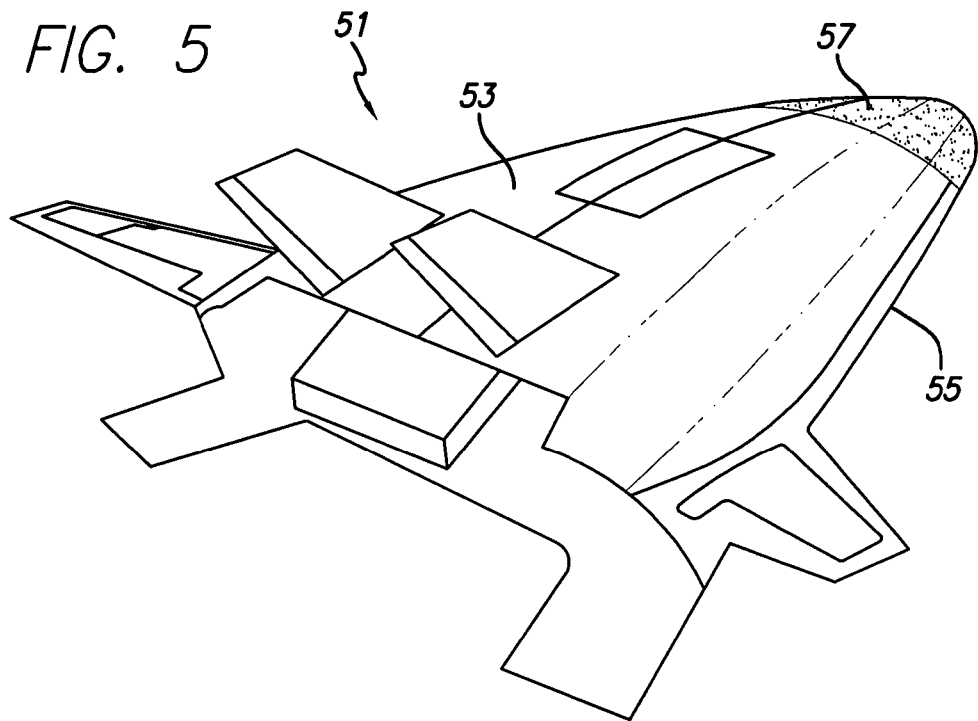
FIG. 5 is a rear view of an exemplary vehicle where the coarsened surface is depicted by the shaded area.
Figure 6:
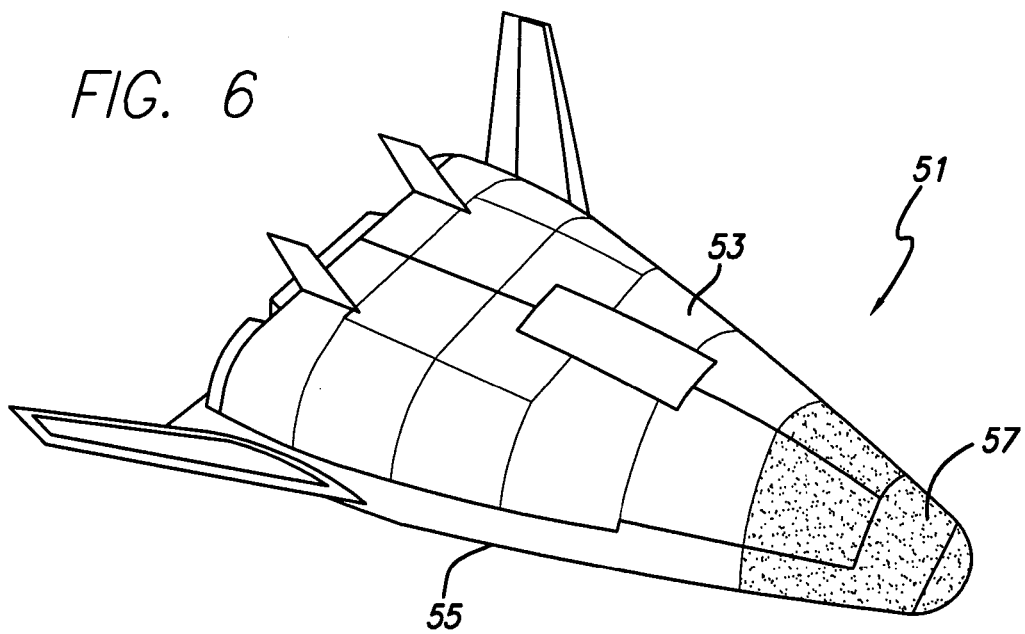
FIG. 6 is a perspective view of an exemplary vehicle where the coarsened surface is depicted by the shaded area.

Referring to FIGS. 5 and 6, the present invention comprises a method of reducing the drag of a vehicle 51 having a forebody 53 and a base 55, that includes coarsening the surface of the vehicle in order to increase drag along the coarsened surface 57, thereby reducing drag along base 55.

In one embodiment of the invention, approximately ⅓ of the forebody 53 of vehicle 51, or of the forebody wetted area, is coarsened, as shown if FIGS. 5 and 6. The coarsening may be accomplished by treating the surface of the vehicle with an abrasive, or attaching a coarsening agent to the vehicle. For example, the coarsening agent may be attached to a vehicle with an adhesive, then sealed with paint. Alternatively, the coarsening agent may be suspended in paint, such as a white enamel paint. The coarsening agent preferably has an average diameter of approximately 0.035 in., although this may vary from 0.001 in. to 0.10 in., depending on the specific characteristics of the subject vehicle. Ideally, but not necessarily, the resulting coarsened surface should have an equivalent sand-grain roughness of between approximately 0.02 and 0.05 in.

In an alternative embodiment, microelectromechanical systems (MEMS) controllers my be disposed beneath the coarsened surface, or within the coarsening mixture to adaptively vary the coarsened surface 57 equivalent roughness according to Mach number, or forward vehicle speed.

In another alternative embodiment, vortex generators may be used in the case of lower-speed vehicles. Vortex generators are very efficient devices for increasing forebody drag and energizing the boundary layer, but are preferably used on vehicles operating at supersonic speeds and below.

All embodiments of the invention may be practiced on flight, ground or aquatic vehicles, and at all speeds, to include hypersonic, although certain modifications known to those skilled in the art may be necessary for a particular application.

While the present invention has been described with regards to particular embodiments, it is recognized that additional variations of the present invention may be devised without departing from the inventive concept.

What is claimed is:

1. A method for reducing the drag of a vehicle having a forebody and a base, comprising irregularly coarsening a surface of the vehicle in order to increase drag along the coarsened surface, thereby reducing drag aft of the coarsened surface, whereby approximately ⅓ of the forebody of the vehicle is coarsened, wherein the vehicle is a flight vehicle, whereby the coarsening is accomplished by attaching a coarsening agent to the vehicle surface, the coarsening agent being applied to approximately ⅓ of the forebody of the vehicle, the coarsening agent having an average diameter of approximately 0.035 inches, whereby the coarsening agent is suspended in paint, wherein the coarsened surface has an equivalent sand-grain roughness of between approximately 0.02 and 0.05 inches, whereby MEMS (Micro-Electro-Mechanical Systems) controllers are used to adaptively vary the coarsened surface equivalent roughness according to Mach number.

2. A method for reducing the drag of a flight vehicle having a forebody wetted area and a base, comprising coarsening approximately ⅓ of the forebody wetted area with a coarsening agent having an average approximate diameter of 0.035 inches to create a coarsened surface, such that the coarsened surface has an equivalent sand-grain roughness of between approximately 0.02 and 0.05 inches, and the coarsened surface includes MEMS (Micro-Electro-Mechanical Systems) controllers to adaptively vary the coarsened surface equivalent roughness according to Mach number in order to increase drag along the coarsened surface, thereby reducing drag along the base.

* * * * *